United States Patent
Chuang et al.

(10) Patent No.: US 6,615,698 B2
(45) Date of Patent: Sep. 9, 2003

(54) DUAL-END BLINDS TRIMMING MACHINE

(75) Inventors: Hsirong Chuang, Cypress, CA (US); Kevin Chang Dien Shieh, Cerritos, CA (US)

(73) Assignee: Custom Craft Co., Cerritos, CA (US)

( * ) Notice: Subject to any disclaimer, the term of this patent is extended or adjusted under 35 U.S.C. 154(b) by 0 days.

(21) Appl. No.: 09/871,009

(22) Filed: May 30, 2001

(65) Prior Publication Data

US 2002/0178884 A1 Dec. 5, 2002

(51) Int. Cl.$^7$ ................................. B26D 7/06
(52) U.S. Cl. ................ 83/24; 83/35; 83/39; 83/100; 83/167; 83/256; 83/404; 83/437.1; 83/409; 83/453; 83/468.4; 83/471.2; 83/477.1; 83/522.19; 144/2.1
(58) Field of Search ............... 83/35, 39, 24, 83/52, 221, 256, 409, 416, 453, 461, 468.1, 468.2, 468.4, 468.6, 468.7, 558, 471.1, 160, 391, 167, 404, 409.1, 412, 422, 437.1, 622, 100, 471.2, 477.1, 522.19, 564, 485; 269/41, 56, 58; 144/2.1

(56) References Cited

U.S. PATENT DOCUMENTS

| | | | | |
|---|---|---|---|---|
| 1,641,636 A | * | 9/1927 | Lasswell ............... 83/468.7 |
| 2,253,453 A | * | 8/1941 | Van Deinse ............ 83/407 |
| 2,603,291 A | * | 7/1952 | Williams .............. 83/373 |
| 3,057,240 A | * | 10/1962 | De Witt .............. 83/412 |
| 3,141,367 A | * | 7/1964 | Keener et al. ........ 83/170 |
| 3,176,556 A | * | 4/1965 | Roberts et al. ....... 83/76.5 |
| 3,260,145 A | * | 7/1966 | Giordano ............. 83/391 |
| 3,459,082 A | * | 8/1969 | Smith et al. ......... 83/153 |
| 3,540,498 A | * | 11/1970 | Woloveke ............. 83/471.1 |
| 3,543,815 A | * | 12/1970 | Menge ................ 83/391 |
| 3,595,287 A | * | 7/1971 | Indermark ............ 144/136.9 |
| 3,665,982 A | * | 5/1972 | Kvalheim ............. 83/404.2 |
| 4,022,094 A | * | 5/1977 | Hetherington ......... 83/409 |
| 4,221,246 A | * | 9/1980 | Grutter .............. 144/198.1 |
| 4,819,530 A | | 4/1989 | Huang |
| 4,907,325 A | | 3/1990 | Hsu |
| 5,103,702 A | * | 4/1992 | Yannazzone ........... 83/29 |
| 5,456,149 A | | 10/1995 | Elsenheimer et al. |
| 5,590,576 A | * | 1/1997 | Ingwersen et al. ..... 83/147 |
| 5,806,394 A | | 9/1998 | Marocco |
| 5,934,164 A | | 8/1999 | Whatley, Jr. |
| 6,142,196 A | | 11/2000 | Schumann et al. |
| 6,216,574 B1 | * | 4/2001 | Hain ................. 83/241 |
| 6,412,381 B1 | | 7/2002 | Wang et al. |
| 6,427,571 B1 | * | 8/2002 | Hsu ................. 83/454 |

* cited by examiner

*Primary Examiner*—Boyer D. Ashley
(74) *Attorney, Agent, or Firm*—Sheldon & Mak

(57) ABSTRACT

A dual-end cutting machine for trimming assembled blinds has fixed spacing between a pair of trimming units, which are adapted from conventional power miter saws. The blind assembly is clamped to a carriage that is movable on tracks between the trimming units, and adjustable stops are supported at opposite ends of the machine. The adjustable stops also have actuators for movement between an advanced position for positioning the blinds for cutting, and a retracted position that facilitates evacuation of scraps and chips from respective collector boxes wherein cutting takes place to a vacuum holding tank. A method for trimming includes clamping the blinds to the carriage with components aligned against one stop member, trimming that end of the blinds, moving the carriage to abut the blinds against the other stop, and trimming the other end of the blinds.

20 Claims, 6 Drawing Sheets

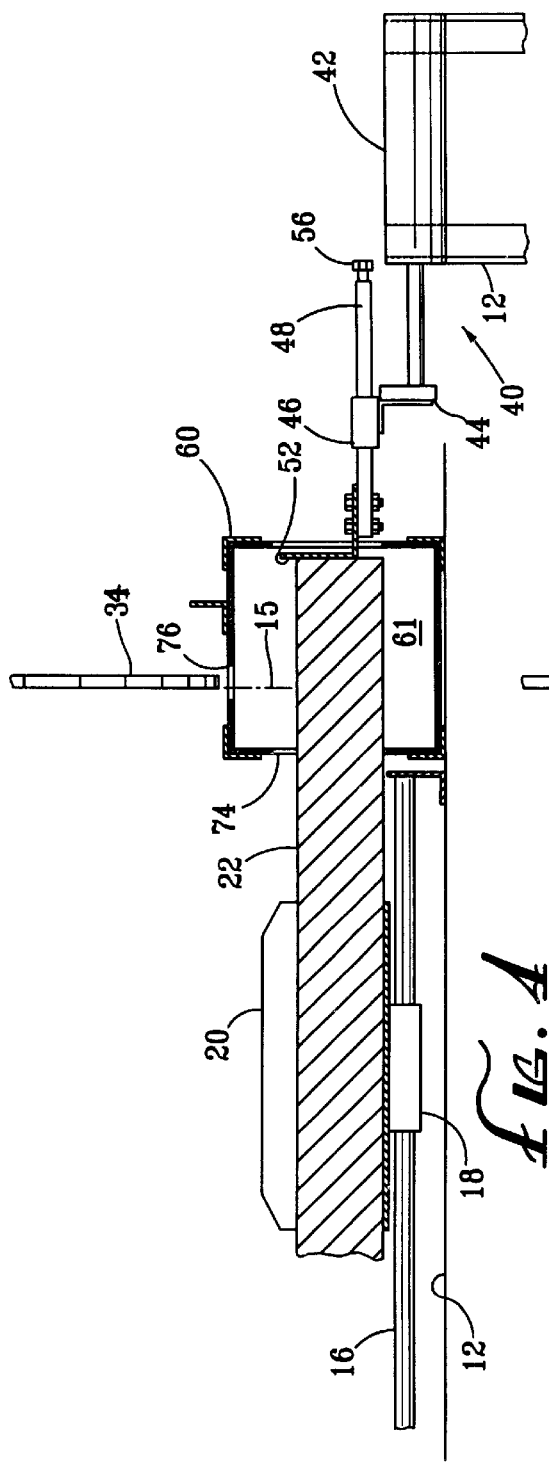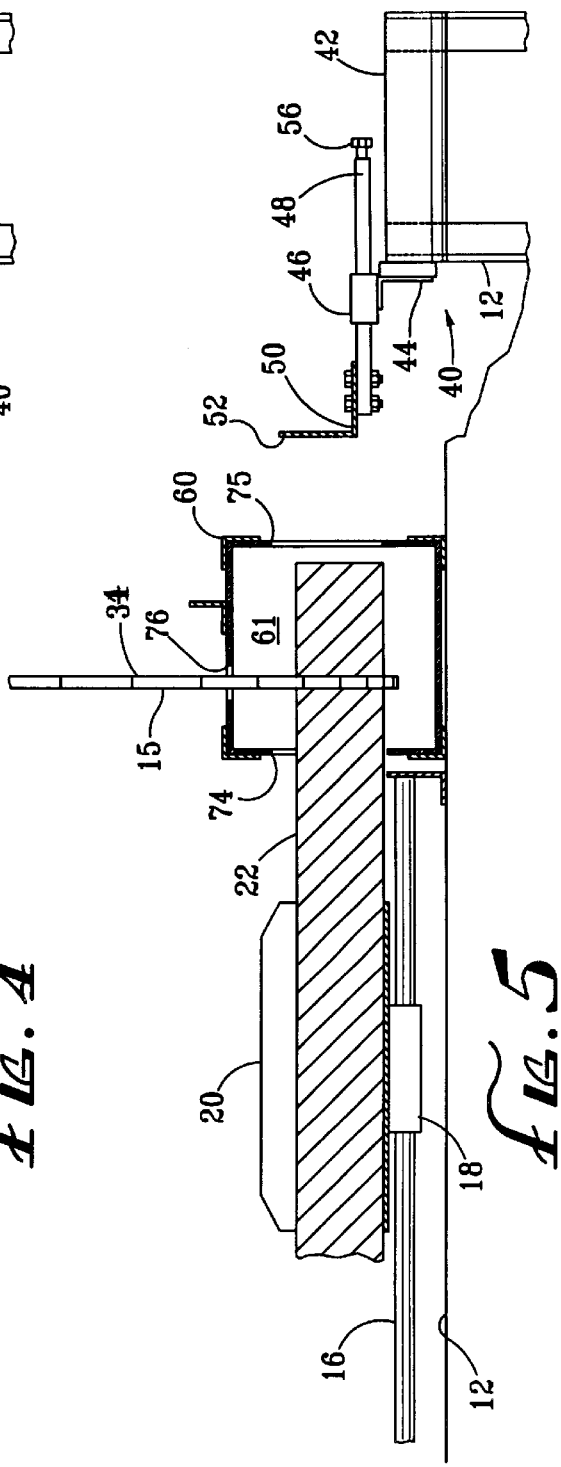

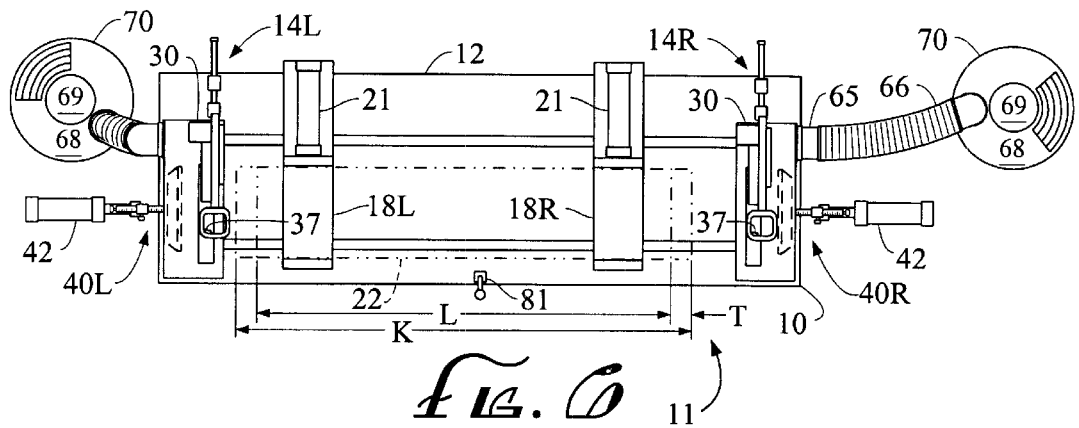
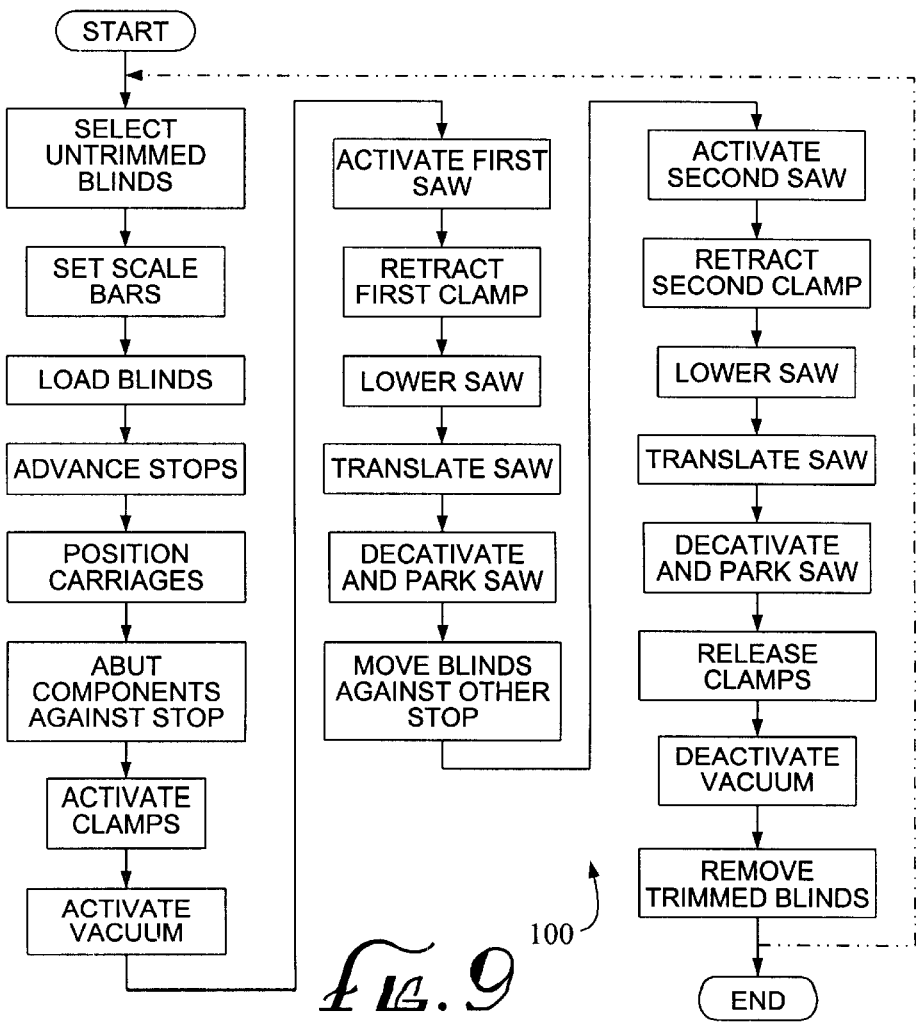

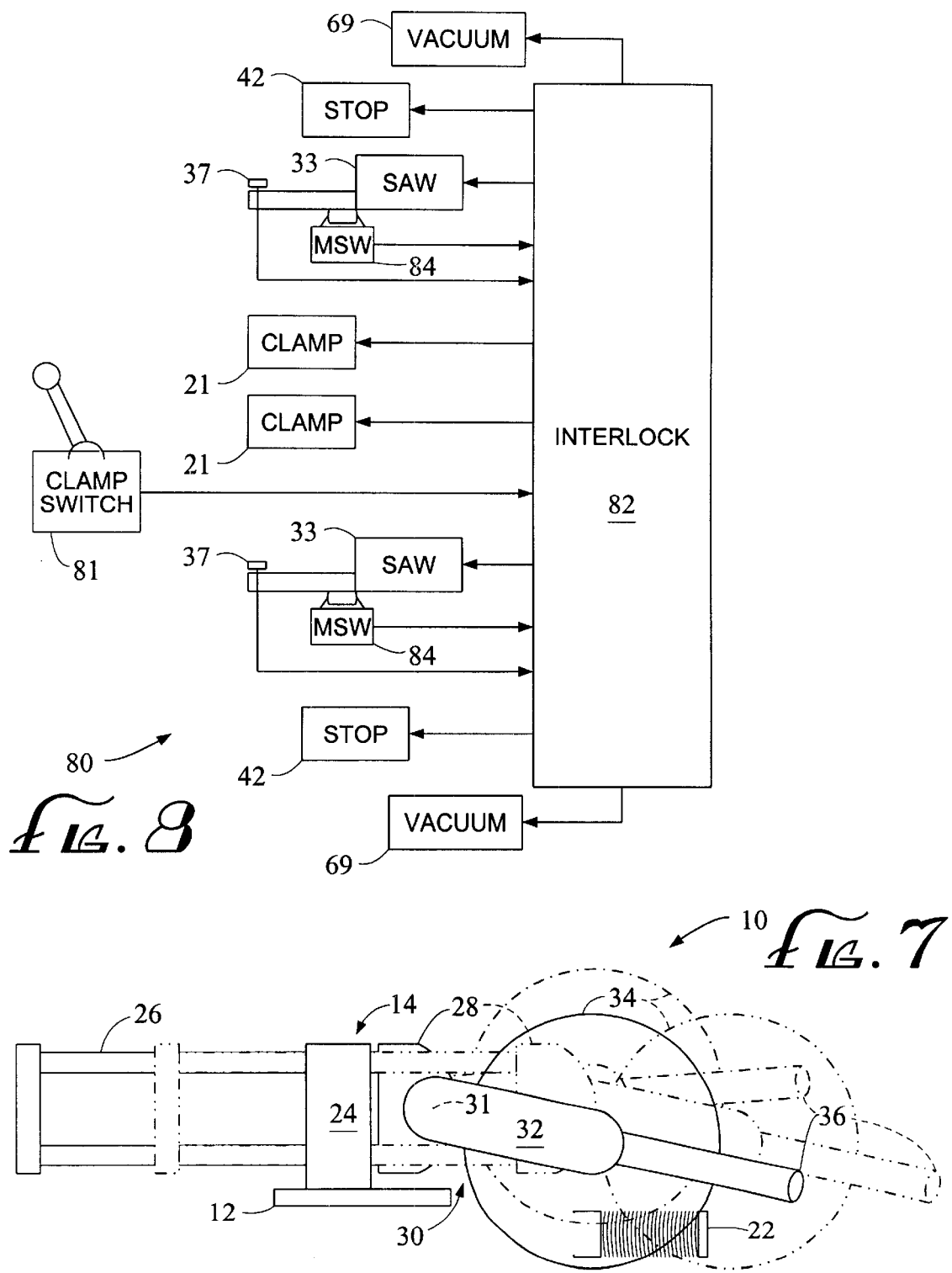

DUAL-END BLINDS TRIMMING MACHINE

BACKGROUND

The present invention relates to venetian blinds, and more particularly to machines and methods for trimming assembled blinds to desired lengths.

Although venetian blinds are commonly provided in a variety of widths as assembled, the window and doorway openings into which they are installed are not of precisely standard widths. Consequently, there has been a continuous need for supplying blinds custom fitted to the openings into which they will be installed. Rather than fabricate the blinds to custom widths prior to assembly, it has been found desirable to perform trimming as necessary at points of sale, or alternatively at factory locations based on orders received against previously assembled blinds. Accordingly, various devices and machines have been proposed and used in the prior art for this purpose. There are a number of objectives associated with custom trimming, including preserving a symmetrical arrangement of pull-cords, making clean cuts that do not permanently distort either the slats or the upper and lower rails, and enabling relatively unskilled personnel to perform the operation safely, quickly, and accurately. In one class of such machines, one end portion of the assembled blinds is clamped in a collapsed or semi-collapsed condition, one half of the excess length being sheared or sawn from the assembly; then, the assembly is removed from the machine, reversed, and the other end is clamped, the remaining excess length being trimmed in a second operation. See, for example U.S. Pat. No. 5,456,149 to Elsenheimer et al, and U.S. Pat. No. 5,806,394 to Marocco.

It is also known to provide separate cutters for trimming respective ends of the assembly. U.S. Pat. No. 4,819,530 to Huang discloses apparatus including a pair of cutting assemblies that are movably supported for sequentially shearing the slats one at-a-time while in an assembled and opened or tautly spaced-apart condition with the top and bottom rails clamped in place. The cutting assemblies are driven symmetrically in opposite directions according to a desired length of the blinds. Each cutting operation includes advancing the blades to embrace a slat and subsequent displacement of one blade to shear the slat. Separate rail-cutting assemblies for cutting the top and bottom rails. The apparatus of Huang suffers from a number of disadvantages, including excessive complexity and expense of the apparatus, imprecise registration of the cutters relative to the individual slats, and excessively slow operation resulting from the sequential cutting and indexing of the cutters.

U.S. Pat. No. 4,907,325 to Hsu discloses a blind trimmer having a pair of saw-type cutters for cutting respective ends of a blind assembly in a collapsed or clamped-together condition thereof. Each of the cutters is included in a respective cutting mechanism, one of the mechanisms being stationary at one end of the trimmer, the other mechanism being movably mounted in adjustably spaced relation to the first mechanism, each of the mechanisms having associated therewith a clamp for clamping the blinds proximate the finished length thereof, the clamps of each mechanism being movably mounted for advancing the blind assembly for simultaneously trimming the opposite ends. The trimmer of Hsu also exhibits a number of disadvantages, including:

1. The need for movably mounting one cutting mechanism adds undesired complexity and expense;
2. The movable mountings of the clamps are subject to binding when the clamps are activated, in that the direction of movement is perpendicular to the spacing of the clamps;
3. The movable mountings of the clamps are further subject to binding, particularly when the spacing is large, by unsymmetric cutting and driving forces that are likely to be present;
4. The upper and lower rails of the blinds are subject to damage during the cutting operation; and
5. The trimmer is objectionably messy and harmful to operators, producing both chips and scraps that are likely to be scattered and blown about by the rotating saws.

Thus there is a need for a wire termination system that overcomes the disadvantages of the prior art.

SUMMARY

The present invention meets this need by providing a dual-end cutting machine having fixed spacing between respective cutting mechanisms. In one aspect of the invention, a machine for trimming assembled blinds having a plurality of slats movably suspended between an upper rail and a lower rail includes a base; a pair of trimming units fixedly supported on the base, each trimming unit having a powered cutting device for cutting components of the blinds in a cutting plane, the cutting planes being parallel-spaced apart by a span distance; a blind-supporting tray carriage supported relative to the base between the cutting planes and guided perpendicular to the cutting planes; and a clamp supported on the tray carriage for fixedly locating the blinds assembly relative thereto in a collapsed condition and oriented perpendicular to the cutting planes, with trimming of respective end portions of the blinds being effected with the blinds clamped to the tray carriage and moved to a desired location relative to respective ones of the cutting planes when the corresponding trimming unit is activated, a finished length of the blinds being the span distance less a distance moved by the carriage between respective trimming operations.

The cutting device of each of the trimming units can include a powered rotary saw that is advancable in its cutting plane relative to the blinds. Each of the trimming units further can also include a saw track supported relative to the base and oriented parallel to the cutting planes, and a saw carriage supported by the track and guided for supporting the saw for movement in its cutting plane. Each of the trimming units can also include an arm pivotally supported on a respective arm axis being oriented perpendicular to the cutting planes, the saw being supported on the arm for arcuate movement in its cutting plane. Preferably each of the trimming units can include the saw track, the saw carriage, the pivotally supported arm, and a handle fixedly projecting from the arm for manually advancing the saw in its cutting plane in a first motion segment wherein the arm pivots about the arm axis, followed by a second motion segment wherein the saw carriage advances parallel to the saw track for facilitating trimming without distortion of components of the assembled blinds.

Preferably the tray carriage is one of a pair of tray carriages, each of the tray carriages supporting a corresponding blinds clamp for clamping the blinds at adjustably spaced-apart locations thereon. The machine can also include a tray carriage track structure fixedly supported on the base and having track surfaces extending a major portion of the span distance between the cutting planes, each of the tray carriages being supported by the carriage track surfaces for translation along the track structure.

Preferably the cutting machine also has a pair of scrap collectors that each include a chip-collection box forming a chip-collecting chamber that extends on opposite sides of a respective one of the cutting planes, the box having a saw opening for admitting a blade of the cutting device, and a workpiece opening for receiving an end portion of the blinds, and an exhaust port for connecting a vacuum device to the chip-collection box for sucking both chips and scraps from the chip-collecting chamber, the exhaust port having an exhaust flow area sufficient for passing the scraps, the exhaust port area being not less than 50 percent of a composite effective inlet area of the chip-collecting chamber when the corresponding trimmer unit is cutting the blinds. Preferably the chip-collection box additionally has a stop opening for receiving an adjustable stop member for registering the blinds prior to cutting, the effective inlet area being inclusive of the effective area of the stop opening. The cutting machine can include the adjustable stop member, the machine also having means for retracting the stop member in response to activation of the associated cutting unit. The cutting machine can include the vacuum device connected to the exhaust duct, the combination of the vacuum device, the chip-collection box, and the duct being effective for exhausting substantially all chips and scraps from the chip-collecting chamber as cutting of the blinds is taking place.

The cutting machine can include a pair of stop mechanisms supported outwardly from the cutting planes for registering the blinds prior to cutting, each stop mechanism including a stop member defining a stop surface parallel to the cutting planes and having a projecting stop arm extending outwardly from and perpendicular to the cutting planes; a stop carriage telescopically receiving the stop arm, the stop carriage being movable between an advanced position and a retracted position in a direction parallel to the stop arm; and means for adjustably clamping the stop arm to the stop carriage to achieve a predetermined distance from the stop surface to the nearest of the cutting planes in the advanced position of the stop carriage. Preferably each of the stop mechanisms also includes a stop actuator for moving the stop carriage to the retracted position in response to activation of a corresponding one of the trimmer units. The stop actuator can include a hydraulic cylinder fixedly supported by the base, with a movable member of the hydraulic cylinder supporting the stop carriage. Preferably a scale rule is mounted relative to one of the stop arm and the stop carriage and a scale reference is mounted relative to the other of the stop arm and the stop carriage for indicating a position of the stop member relative to the stop carriage. Preferably one of the scale rule and the scale reference is adjustably mounted for calibrating readings of the scale rule relative to reductions in length of the blinds to be made by the machine.

In another aspect of the invention, a method for trimming the assembled blinds includes:

(a) providing a machine having first and second trimmer units, each trimmer unit having a cutting plane, the cutting planes being parallel-spaced apart by a span distance, a blinds carriage being movable between and perpendicular to the cutting planes, the cutter units also having respective first and second adjustable stops associated therewith;

(b) clamping the blinds in a collapsed condition to the blinds carriage;

(c) adjusting each of the stops for a desired length of the blinds to be removed from respective ends thereof;

(d) moving the blinds carriage until the rails and slats of the blinds contact the first stop;

(e) activating the first trimmer unit;

(f) advancing the first trimmer unit relative to the carriage for trimming one end of the blinds at the corresponding cutting plane;

(g) moving the carriage until the blinds contact the second stop;

(h) activating the second cutter unit; and (i) advancing the second cutter unit relative to the carriage for trimming the other end of the blinds at the corresponding cutting plane.

The method can further include retracting the first stop in response to activation of the first trimmer unit, and retracting the second stop in response to activation of the second cutter unit. The method can further include providing for each of the cutter units a chip-collecting chamber that extends on opposite sides of the corresponding cutting plane, the chamber having a blade opening for admitting a blade of the cutting device, a workpiece opening for receiving an end portion of the blinds, and an outlet port; connecting a conduit between each of the outlet ports to a vacuum holding tank; in the moving of the carriage, advancing the blinds into respective ones of the chip collecting chambers; and pumping air from the chambers to the holding tank at sufficient volume and velocity to carry into the tank substantially all chips and scraps being removed by the cutter units.

DRAWINGS

These and other features, aspects, and advantages of the present invention will become better understood with reference to the following description, appended claims, and accompanying drawings, where:

FIG. 4 is a sectional view of the machine of FIG. 1 on line 4—4 of FIG. 3, showing the cutting mechanism in a rest position, the clamp carriage and blinds carried thereby in a retracted position, and the adjustable stop portion advanced against the blinds;

FIG. 5 is a sectional view as in FIG. 4, showing the stop portion retracted beyond a cutter path of the cutter mechanism, clamp carriage in an advanced position with the blinds again contacting the stop portion, and the cutting mechanism being advanced through the blinds; and FIG. 6 is a plan view of the machine of FIG. 1 in a system including vacuum waste collectors;

FIG. 7 is an elevational diagram view showing operation of a trimming unit of the machine of FIG. 1;

FIG. 8 is a pictorial block diagram of the system of FIG. 6; and

FIG. 9 is a flow chart depicting operation of the cutting machine of FIG. 1.

DESCRIPTION

Figure 1:
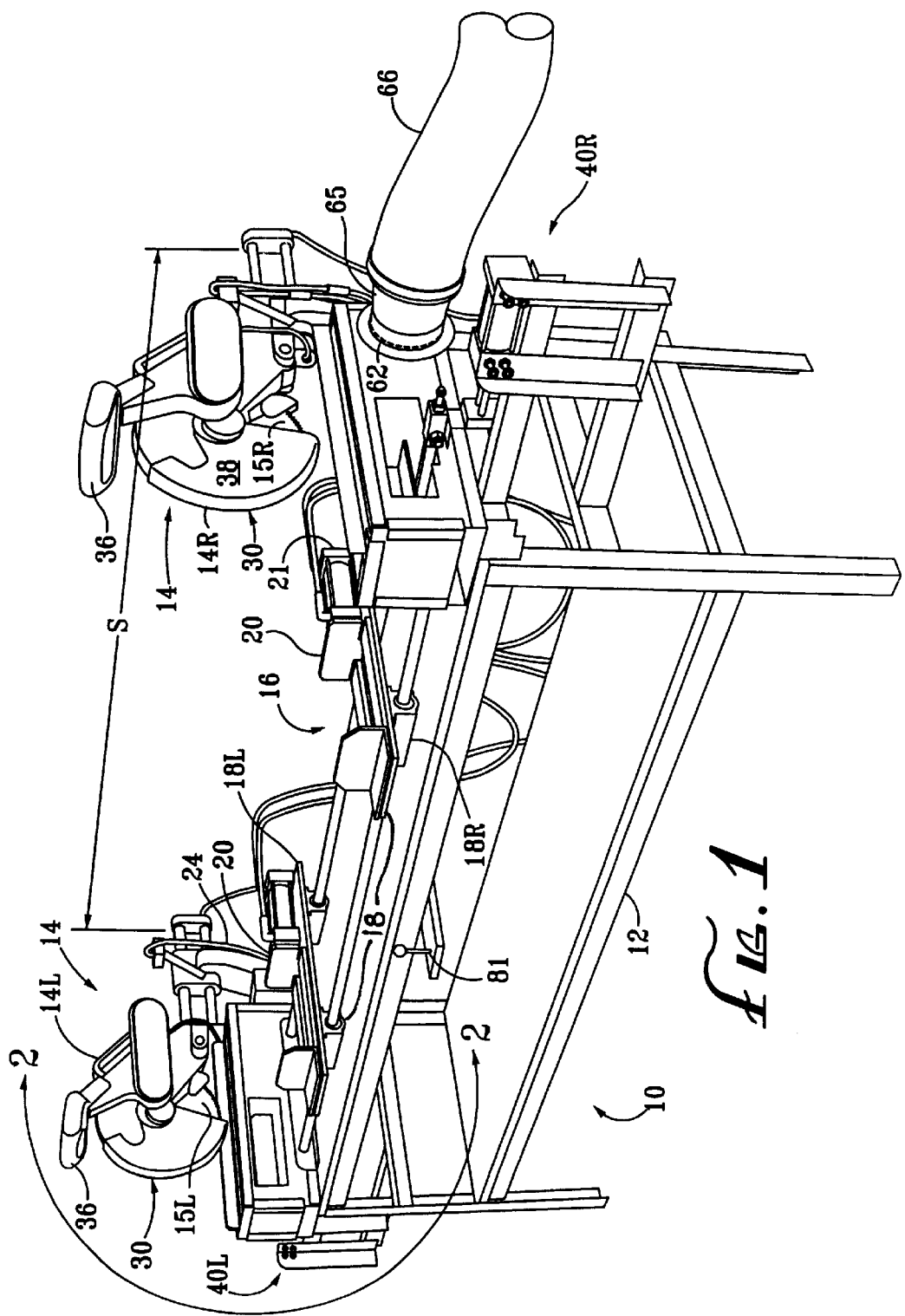
FIG. 1 is a perspective view of a dual-end blind cutting machine according to the present invention.

The present invention is directed to a dual-end blind cutting machine that is particularly effective in sizing pre-assembled blinds to predetermined length. With reference to FIGS. 1–7 of the drawings, a cutting machine 10 of a blinds trimming system 11 includes a floor-supported base or frame 12 having a powered saw or trimming unit 14 at each end thereof. The trimming units, individually designated left trimming unit 14L and right trimming unit 14R, provide a parallel-spaced pair of cutting planes 15, the cutting planes being correspondingly designated 15L and 15R. A spacing S between the cutting planes 15 is indicated in FIG. 1 as corresponding to a spacing of the trimming units 14, the trimming units being identically configured. It will be understood, however, that the trimming units 14 need not be identically configured. A laterally oriented workpiece track assembly 16 is supported on the frame 12 between the trimming units 14, and a pair of tray carriages 18 (individually designated 18L and 18R) are rollably supported on the track assembly 16, each of the carriages 18 having a clamp assembly 20 mounted thereon for clamping a blinds assembly 22 as a workpiece to be supported on the tray carriages 18 for lateral movement relative to the trimming units 14. Each clamp assembly 20 includes a clamp actuator 21 which is configured as a hydraulic or, preferably, a pneumatic cylinder.

In general, the blinds assembly 22 are clamped to the tray carriages 18 with the carriages spaced inwardly from the locations of cuts to be made. The carriages 18 and the assembly 22 are positioned as desired relative to one of the trimming units 14 and a cut is made. Subsequently, the carriages 18 and the assembly 22 (remaining clamped as before) are positioned relative to the other trimming unit 14, and a second cut is made, whereby opposite ends of the blinds assembly 22 are trimmed to obtain a desired predetermined finished length L of the blinds assembly 22, being the spacing S less the distance moved by the carriages 18 between operations of the trimming units 14L and 14R. It will be understood that a single counterpart of the carriage 18, having either one or a pair of clamp assembly counterparts, can be utilized in situations wherein there will be a relatively small variation in the predetermined length relative to the spacing S between the cutting planes 15.

Preferably the spacing S is fixed, either permanently or semi-permanently. This arrangement advantageously facilitates accurate cutting with a relatively inexpensive apparatus, because the carriages 18 are much easier to guide and move than is the spacing between the cutting planes 15 made continuously and precisely adjustable, in that the blinds assembly 22 is much lighter and easier to support than either of the saw units 14. In the exemplary preferred configuration of the cutting machine 10 shown in the drawings, the trimming units 14 are fixed relative to the frame 12. Also, each of the saw units 14 includes a riser 24 that is fixedly mounted to the frame, a saw track 26 forwardly projecting from the riser 24 and axially movable on suitable antifriction bearings (not shown) for movably supporting a saw carriage 28 having a power saw 30 pivotally supported on a pivot axis 31. The power saw 30 of each saw unit 14 includes an arm 32 that extends from the pivot axis to a drive motor 33 that powers a rotating circular blade 34, the arm 32 also having a suitable handle 36 projecting therefrom to be grasped by an operator of the machine 10, a momentary saw switch 37 being provided on the handle 36 for activating the power saw 30. Preferably the power saw 30 also has a suitable blade guard 38.

As best shown in FIG. 7, the combination of the saw track 26 and the pivoting arm 32 advantageously allows the saw 30 to be arcuately advanced relative to the saw carriage 28 sufficiently downwardly for the blade 34 to cut through a portion of the blinds assembly 22 as indicated by solid lines in FIG. 7, a partially lowered position of the saw 30 being indicated by single-dashed lines. The lowering of the saw 30 is followed by the combination of the saw carriage 28 and the power saw 30 being pulled forwardly toward the operator to the position indicated by double-dashed lines in FIG. 7 for completing a cut through the blinds assembly 22. In this way, distortion of components of the blinds assembly 22 is significantly reduced relative to systems having a saw that is advanced in a single-segment path through assembled blinds. Saw appliances suitable for use as the saw units 14 are commercially available, one such being Model DW 708 DeWalt Miter saw, from DeWalt Corp. of Lancaster, Pa.

Figure 2:
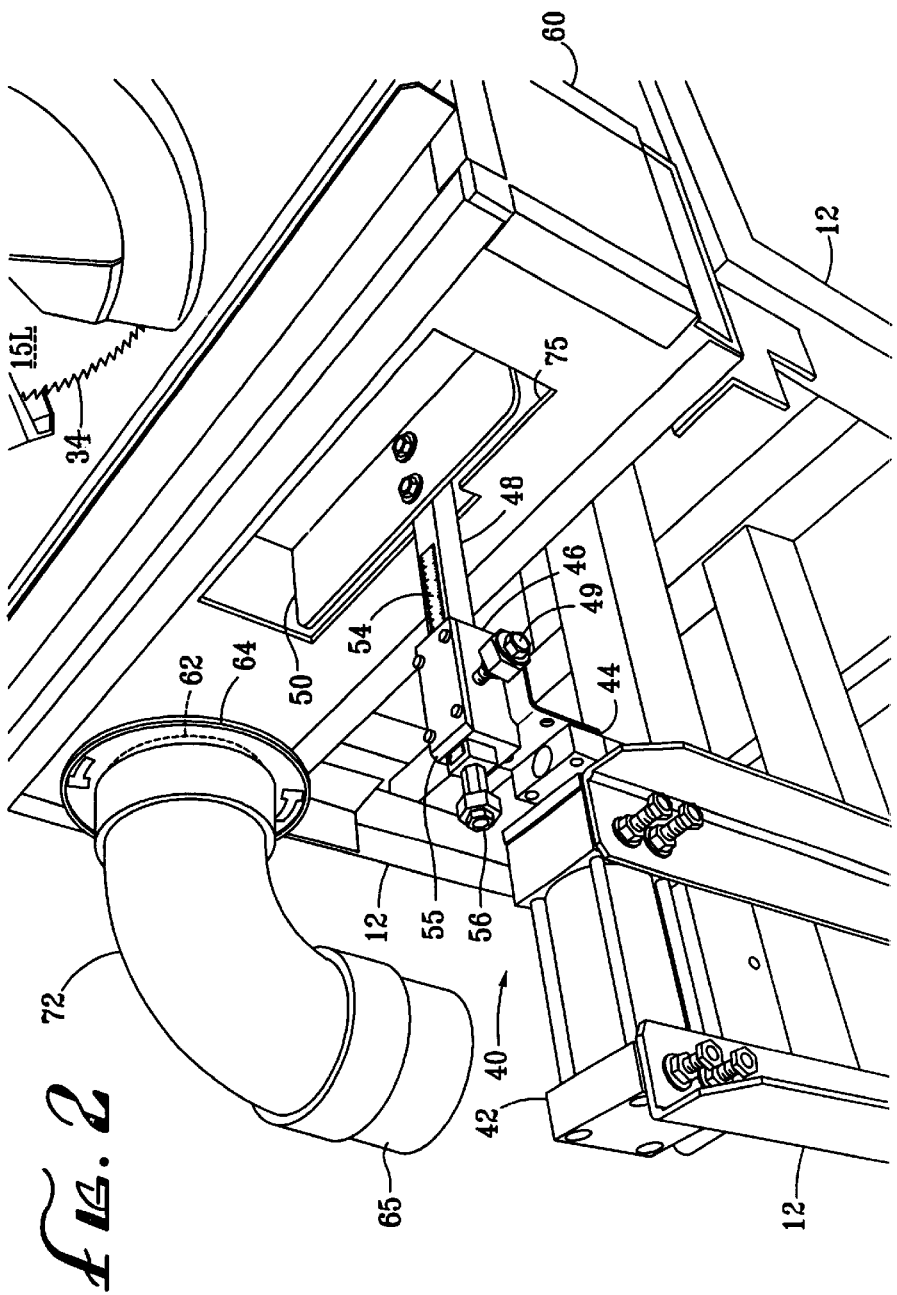
FIG. 2 is a perspective view of an adjustable stop portion of the machine of FIG. 1 as indicated by line 2—2 therein.
Figure 3:
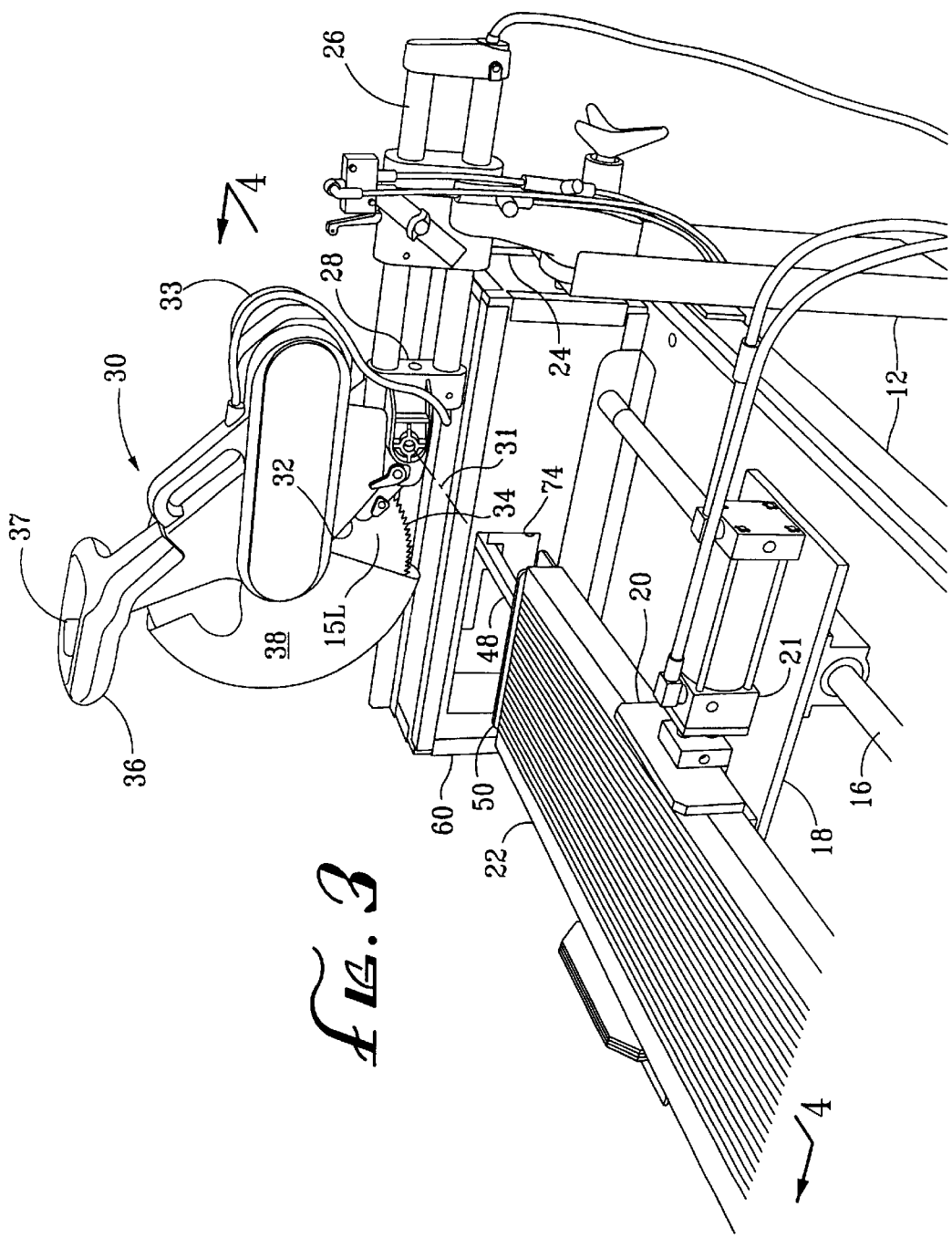
FIG. 3 is a perspective view of one cutting mechanism and associated clamp carriage of the machine of FIG. 1.

Positioning of the blinds assembly 22 prior to trimming is facilitated by a pair of adjustable stop units 40 (individually designated left stop unit 40L and right stop unit 40R). Each of the stop units 40 includes a stop actuator 42 that supports a stop carriage 44 for powered movement in a direction perpendicular to the cutting planes 15 between a retracted position shown in FIGS. 2 and 5, and an advanced position shown in FIG. 4. A guide block 46 is mounted on the carriage 44 for supporting and slidably engaging a scale bar 48, the bar 48 being moveable relative to the carriage 42, also in the direction perpendicular to the cutting planes 15, and being lockable at a desired extension from the carriage 42 by a clamping lock screw 49 having threaded engagement with the block 46 as shown in FIG. 2. A stop member 50 is rigidly fastened to the scale bar 48 (which is also referred to as a stop arm), the stop member having a stop surface 52 being oriented parallel to the cutting planes 15 for engagement by end extremities of elements of the blinds assembly 22. The scale bar 48 is positioned relative to the guide block 46 and clamped by the lock screw 49 to a desired extension in accordance with a length to be trimmed from the blinds assembly 22.

A scale rule 54 is mounted on the scale bar 48 for facilitating proper positioning of the bar 48. Preferably the scale rule 54 is axially adjustably mounted on the scale bar 48, the adjustment being effected by a lockable scale adjustment screw 56 for calibration of the cutting machine 10. The scale rule 54 can have conventional English or Metric markings, which are read against a scale reference 55 that is located on the guide block 46 proximate the scale rule 54. A preferred alternative is for the scale rule 54 to have half-scale indicia for direct reading of a total length to be trimmed from both ends of the blinds assembly 22. The calibration can be done by providing a dummy workpiece of known length, setting and clamping the scale bar to an arbitrary position relative to the guide block, operating the machine 10 for trimming one end from the dummy workpiece, measuring the dummy workpiece to determine a reduction in the length thereof, and adjusting the scale rule 54 to obtain a reading corresponding to the reduction in length. Both of the stop units 40 can be calibrated in like manner, and the trimmed length of the dummy workpiece can be used as the known length when calibrating the second of the stop units. It will be understood that the scale rule 54 can be mounted on either the guide block 46 or the scale bar 48, the scale reference 55 being provided on the other structure. Also, the scale rule 54 can be immovably mounted, the scale reference being adjustably mounted.

It is contemplated that the blinds assembly 22 is initially provided and stocked in raw lengths K (FIG. 6) that vary by increments of, for example, 6 inches. Based on the desired finished length L, a selection from stock is made for the smallest raw length K that is not smaller than L. The stop mechanisms 40 are then set for a trimming distance T=(K−L)/2 between the cutting planes 15 and the stop surfaces 52 in the advanced positions of the stop carriages 44. Of course, if K=L no trimming is required. Otherwise, the required trimming in the above example is less than 3 inches from each end of the blinds assembly 22.

With particular reference to FIGS. 1, 2, and 4–6, the cutting machine 10 also includes, for each of the trimming units 14, a collection box 60 defining a collecting cavity or chamber 61 and having an exhaust port 62 for connection to a suitable vacuum source. More particularly, the exhaust port 62, preferably of large area and being located at a lower rear portion of the box 60, is configured for receiving a quick-release flange fitting 64 of the trimming system 11. As shown in FIGS. 1 and 6, the flange fitting 64 is connected through a coupling 65 to a flexible hose 66, the hose 66 being connected through a hopper or holding tank 68 to a vacuum pump 69. As shown in FIG. 6, the holding tank 68 and vacuum pump 69 can be combined in a suitable large-capacity shop-type vacuum cleaner 70, separate vacuum cleaners 70 being provided for each of the trimming units 14, a large-diameter elbow fitting 72 being connected between the flange fitting 64 and the coupling 65 as indicated in FIG. 2, for facilitating a smooth, unobstructed path to the associated vacuum cleaner 70. It will be understood that the hoses 66 can be connected to a single holding tank. Also, a free-flow selector valve (not shown) can be connected between respective ones of the hoses 66 and the tank, the valve being operated for directing vacuum flow from only one of the collection boxes 60, depending on activation of the associated trimming unit 14. It will be further understood that the separate vacuum cleaners 70 of the exemplary configuration of FIG. 6 can be either continuously powered while the machine 10 is in operation, or intermittently powered according to activation of the trimming units 14.

Each of the collection boxes 60 has a workpiece opening 74 facing the opposite trimming unit 14, an oppositely facing stop opening 75 for passage of the stop member 50, and an upwardly facing blade opening 76 for admitting portions of the saw blade 34 of the corresponding power saw 30. The workpiece opening 74 is of sufficient height and extends sufficiently horizontally to receive the deepest and highest (collapsed height) of the blinds assembly 22 being contemplated. It will be understood that the terms "deepest" and "highest" relates to horizontal thickness and vertical height of the blinds assembly in an "as-installed" orientation. The stop opening 75 is similarly sized with the workpiece opening 74, in that the stop member 50 must be of sufficient length to contact both top and bottom rails as well as each of the slats of the blinds assembly 22. However, if the collection boxes extend sufficiently beyond the cutting planes 15 to accommodate the untrimmed length of the blinds assembly 22, the stop opening need only to be of sufficient height to pass the stop member 50, which need not be as high as the depth of the blinds assembly.

An important feature of the present invention is that trimmed-off portions of the blinds assembly 22 as well as chips produced by the saw blade 34 are advantageously sucked out of each of the collection boxes 60 and carried away to the holding tanks 68 by virtue of a relatively high velocity of air flow from the collection boxes 60. For this purpose, the exhaust port 62 preferably has an effective area that is not less than 50 percent of a total effective area of the openings 74, 75, and 76 when the trimming unit 14 is cutting the blinds assembly 22. Thus cleaning of the collection boxes 60 is not normally required. However, any required cleaning of the boxes 60 or clearing of the hoses 66 is facilitated by uncoupling of the flange fittings 64 from the boxes 60.

With reference to FIG. 8, a control circuit 80 of the system 11 includes a clamp switch 81 for activating the clamp assemblies 20 of the tray carriages 18. In an exemplary configuration, the control circuit 80 includes a control interlock 82, the clamp actuators 21 being activated by the control interlock in response to operation of the clamp switch. FIG. 8 also shows the saw switches 37 connected as inputs to the control interlock 82, and additional output connections from the control interlock to the saw drive motors 33, the stop actuators 42, and the vacuum pumps 69. Preferably, an arm microswitch 84 associated with each of the saws 30 is connected as an additional input to the control interlock 82 for signaling movement of the corresponding trimming unit arm 32 downwardly from a rest position thereof. The control interlock is preferably implemented for providing the following functions:

1. Upon application of power, advancing the stop actuators 42;
2. Advancing the clamp actuators 21 in accordance with operation and holding of the clamp switch 81;
3. Powering each of the saw drive motors 33 in accordance with operation and holding of the corresponding saw switch 37;
4. Activating each of the vacuum pumps 69 upon powering of the corresponding saw 30;
5. Retracting each of the stop actuators 42 in response to the corresponding arm microswitch 84 when there is predetermined downward movement of the respective arm 32, provided that the associated saw drive motor 33 is powered;

6. Deactivating each of the vacuum pumps in response to the corresponding arm microswitch 84 when the respective arm is returned to its raised position;
7. Following the powering of either of the saws 30, preventing retraction of the clamp actuators 21 until neither of the saws is powered and both of the arm microswitches signal the raised positions of the respective arms 32; and
8. Advancing the stop actuators 42 after a predetermined time delay following the retraction of the clamp actuators 21.

Implementation of the above-listed functions is within the ordinary skill of those in the control and automation arts. The control interlock can incorporate hydraulic, pneumatic, electrical and/or electronic circuit elements in any suitable manner. Thus the clamp switch 81 can be, for example, an electrical switch or a pneumatic valve. The outputs to the various actuators can be implemented with 4-way pilot valves, and the outputs to the saws 30 and the vacuum pumps 69 can utilize electrical relays. Also, the specific functional characteristics can be in accordance with the stored program of a microprocessor included in the control interlock 82. It will be also understood that variations of the above functions are also contemplated. For example, the saw drive motors 33 can be powered directly through the respective saw switches 37, and the vacuum pumps 69 can be powered in direct correspondence with the powering of the associated saw 30. Further, the clamp actuators 21 can be activated in direct accordance with operation of the clamp switch 81, without regard to powering of the saw drive motors 30 or movement of the arms 32. Moreover, the advancement of the stop actuators can be in response to operator input.

With reference to FIG. 9, a process 100 for trimming a blinds assembly includes selecting an untrimmed blinds assembly 22 having a length minimally greater than a desired trimmed length; setting the scale bars 48 of the cutting machine 10 for removing half of the excess length from each end of the untrimmed blinds assembly 22; with the clamp assemblies 20 released, placing the blinds assembly 22 on the tray carriages 18; with the stop actuators 42 in respective advanced positions, positioning the tray carriages 18 sufficiently inwardly from opposite ends of the blinds assembly for permitting travel of the carriages together with the blinds assembly against the stop surfaces 52; abutting components of the blinds assembly against one of the stop surfaces 52; activating the clamps 20; operating the one trimming unit 14 associated with the one stop surface 52 for cutting the blinds assembly at the corresponding cutting plane 15; moving the tray carriages 18 with the partially trimmed blinds assembly against the other stop surface 52; operating the other trimming unit 14 for cutting the blinds assembly at the other cutting plane; releasing the clamps 20; and removing the completed blinds assembly from the machine 10.

Although the present invention has been described in considerable detail with reference to certain preferred versions thereof, other versions are possible. For example, the stop actuators 42 can be controlled depending on the setting of the scale bars 48 such that the retracted position of the stop members 50 blocks the stop openings 75 to substantially the same extent, regardless of the scale bar setting.

Therefore, the spirit and scope of the appended claims should not necessarily be limited to the description of the preferred versions contained herein.

What is claimed is:

1. An dual-end cutting machine for assembled blinds having a plurality of slats movably suspended between an upper rail and a lower rail, the machine comprising:
   (a) a base;
   (b) a pair of trimming units fixedly supported on the base, each trimming unit having a powered rotary saw for cutting components of the blinds in respective cutting planes, the saws being advancable in the respective cutting planes relative to the blinds, the cutting planes being parallel-spaced apart by a span distance, each of the trimming units further comprising:
      (i) a saw track supported relative to the base and oriented parallel to the cutting planes;
      (ii) a saw carriage supported by the track, the saw carriage being guided parallel to the cutting planes;
      (iii) an arm pivotally supported by the carriage on a pivot axis; and
      (iv) a handle fixedly projecting from the arm for manually advancing respective the saws in the respective cutting planes thereof in a first motion segment wherein the arm pivots about the arm axis, followed by a second motion segment wherein the saw carriage advances parallel to the saw track;
   (c) a pair of blind-supporting tray carriages supported relative to the base between the cutting planes and guided perpendicular to the cutting planes, each of the tray carriages having a clamp supported thereon for fixedly clamping the blinds assembly in a collapsed condition at spaced apart locations, the blinds being oriented perpendicular to the cutting planes;
   (d) a pair of stop mechanisms supported on the base outwardly from the cutting planes for registering the blinds prior to cutting, each stop mechanism comprising:
      (i) a stop member defining a stop surface parallel to the cutting planes and having a projecting stop arm extending outwardly from and perpendicular to the cutting planes;
      (ii) a stop carriage telescopically receiving the stop arm, the stop carriage being movable between an advanced position and a retracted position in a direction parallel to the stop arm;
      (iii) a stop actuator for moving the stop carriage to the retracted position in response to activation of a corresponding one of the trimmer units; and
      (iv) means for adjustably clamping the stop arm to the stop carriage to achieve a predetermined distance from the stop surface to the nearest of the cutting planes in the advanced position of the stop carriage; and
   (e) a pair of scrap collectors, each scrap collector comprising a chip-collection box forming a chip-collecting chamber that extends on opposite sides of a respective one of the cutting planes, the box having a saw opening for admitting a blade of the cutting device, a workpiece opening for receiving an end portion of the blinds, a stop opening for receiving the stop member of a corresponding one of the stop mechanisms, and an exhaust port for connecting a vacuum device to the chip-collection box for sucking both chips and scraps from the chip-collecting chamber, the exhaust port having an exhaust flow area sufficient for passing the scraps, the exhaust port area being not less than 50 percent of a composite effective inlet area of the chip-collecting chamber when the corresponding trimmer unit is cutting the blinds, trimming of respective end portions of the blinds being effected with the blinds clamped to the tray carriages and moved with components of the blinds moved into abutment with one of the stop members in the advanced position thereof upon operation of the associated trimmer unit, the carriage being subsequently moved with the components of the blinds abutting the other of the stop members in the advanced position thereof at operation of the other of the trimmer units a finished length of the blinds being an initial length of the blinds less the total distance between the cutting planes and the stop members in the advanced positions thereof.

2. A method for trimming assembled blinds having a plurality of slats movably suspended between an upper rail and a lower rail, the method comprising:

(a) providing a machine having first and second trimmer units, each trimmer unit having a cutting plane, the cutting planes being parallel-spaced apart by a span distance, a blinds carriage being movable between and perpendicular to the cutting planes, the trimmer units also having respective first and second adjustable stops associated therewith;

(b) clamping the blinds in a collapsed condition to the blinds carriage;

(c) adjusting each of the stops for a desired length of the blinds to be removed from respective ends thereof;

(d) moving the blinds carriage until the rails and slats of the blinds contact the first stop;

(e) activating the first trimmer unit;

(f) advancing the first trimmer unit relative to the carriage for trimming one end of the blinds at the corresponding cutting plane;

(g) moving the carriage until the blinds contact the second stop;

(h) activating the second trimmer unit; and (i) advancing the second trimmer unit relative to the carriage for trimming the other end of the blinds at the corresponding cutting plane.

3. The method of claim 2, further comprising retracting the first stop in response to activation of the first trimmer unit, and retracting the second stop in response to activation of the second cutter unit.

4. The method of claim 2, further comprising:

(a) providing for each of the trimmer units a chip-collecting chamber that extends on opposite sides of the corresponding cutting plane, the chamber having a blade opening for admitting a blade of the cutting device, a workpiece opening for receiving an end portion of the blinds, and an outlet port;

(b) connecting a conduit between each of the outlet ports to a vacuum holding tank;

(c) in the moving of the carriage, advancing the blinds into respective ones of the chip collecting chambers; and (d) pumping air from the chambers to the holding tank at sufficient volume and velocity to carry into the tank substantially all chips and scraps being removed by the trimmer units.

5. A dual-end cutting machine for assembled blinds having a plurality of slats movably suspended between an upper rail and a lower rail, the machine comprising:

(a) a base;

(b) a pair of trimming units fixedly supported on the base, each trimming unit having a powered cutting device for cutting components of the blinds in a cutting plane, the cutting planes being parallel-spaced apart by a span distance;

(c) a blind-supporting tray carriage supported relative to the base between the cutting planes and guided perpendicular to the cutting planes; and (d) a clamp supported on the tray carriage for fixedly locating the blinds assembly relative thereto in a collapsed condition and oriented perpendicular to the cutting planes, trimming of respective end portions of the blinds being effected with the blinds clamped to the tray carriage and moved to a desired location relative to respective ones of the cutting planes when the corresponding trimming unit is activated, a finished length of the blinds being the span distance less a distance moved by the carriage between respective trimming operations.

6. The cutting machine of claim 5, wherein the tray carriage is one of a pair of tray carriages, each of the tray carriages supporting a corresponding blinds clamp for clamping the blinds at adjustably spaced-apart locations thereon.

7. The cutting machine of claim 6, further comprising a tray carriage track structure fixedly supported on the base and having track surfaces extending a major portion of the span distance between the cutting planes, each of the tray carriages being supported by the carriage track surfaces for translation along the track structure.

8. The cutting machine of claim 5, wherein the cutting device of each of the trimming units comprises a powered rotary saw, the saw being advancable in the cutting plane thereof relative to the blinds.

9. The cutting machine of claim 8, wherein each of the trimming units further comprises a saw track supported relative to the base and oriented parallel to the cutting planes, and a saw carriage supported by the track and guided for supporting the saw for movement in the cutting plane thereof.

10. The cutting machine of claim 8, wherein each of the trimming units further comprises an arm pivotally supported on a respective arm axis being oriented perpendicular to the cutting planes, the saw being supported on the arm for arcuate movement in the respective cutting plane.

11. The cutting machine of claim 8, wherein each of the trimming units further comprises:

(a) a saw track supported relative to the base and oriented parallel to the cutting planes;

(b) a saw carriage supported by the track, the saw carriage being guided parallel to the cutting planes;

(c) an arm pivotally supported by the carriage on a pivot axis; and (d) a handle fixedly projecting from the arm for manually advancing the saw in the cutting plane thereof in a first motion segment wherein the arm pivots about the arm axis, followed by a second motion segment wherein the saw carriage advances parallel to the saw track.

12. The cutting machine of claim 5, further comprising a pair of scrap collectors, each scrap collector comprising a chip-collection box forming a chip-collecting chamber that extends on opposite sides of a respective one of the cutting planes, the box having a saw opening for admitting a blade of the cutting device, and a workpiece opening for receiving an end portion of the blinds, and an exhaust port for connecting a vacuum device to the chip-collection box for sucking both chips and scraps from the chip-collecting chamber, the exhaust port having an exhaust flow area sufficient for passing the scraps, the exhaust port area being not less than 50 percent of a composite effective inlet area of the chip-collecting chamber when the corresponding trimmer unit is cutting the blinds.

13. The cutting machine of claim 12, wherein the chip-collection box additionally has a stop opening for receiving an adjustable stop member for registering the blinds prior to cutting, the effective inlet area being inclusive of the effective area of the stop opening.

14. The cutting machine of claim 12, including the adjustable stop member, the machine further comprising means for retracting the stop member in response to activation of the associated cutting unit.

15. The cutting machine of claim 12, including the vacuum device connected to the exhaust port, the combination of the vacuum device, the chip-collection box, and the exhaust port being effective for exhausting substantially all chips and scraps from the chip-collecting chamber as cutting of the blinds is taking place.

16. The cutting machine of claim 5, further comprising a pair of a stop mechanisms supported outwardly from the cutting planes for registering the blinds prior to cutting, each stop mechanism comprising:

(a) a stop member defining a stop surface parallel to the cutting planes and having a projecting stop arm extending outwardly from and perpendicular to the cutting planes;

(b) a stop carriage telescopically receiving the stop arm, the stop carriage being movable between an advanced position and a retracted position in a direction parallel to the stop arm; and (c) means for adjustably clamping the stop arm to the stop carriage to achieve a predetermined distance from the stop surface to the nearest of the cutting planes in the advanced position of the stop carriage.

17. The cutting machine of claim 16, wherein each of the stop mechanisms further comprises a stop actuator for moving the stop carriage to the retracted position in response to activation of a corresponding one of the trimmer units.

18. The cutting machine of claim 17, wherein the stop actuator comprises a hydraulic cylinder fixedly supported by the base, the stop carriage being supported by a movable member of the hydraulic cylinder.

19. The cutting machine of claim 16, further comprising a scale rule mounted relative to one of the stop arm and the stop carriage and a scale reference mounted relative to the other of the stop arm and the stop carriage for indicating a position of the stop member relative to the stop carriage.

20. The cutting machine of claim 19, wherein one of the scale rule and the scale reference is adjustably mounted for calibrating readings of the scale rule relative to reductions in length of the blinds to be made by the machine.

* * * * *